United States Patent [19]

Wahl et al.

[11] 4,400,279

[45] Aug. 23, 1983

[54] PROCESS AND EQUIPMENT FOR RENDERING VISIBLE THE CHARGE OF ION EXCHANGERS

[75] Inventors: Klaus Wahl, Markdorf; Klaus Purps, Hagnau, both of Fed. Rep. of Germany

[73] Assignee: Dornier System GmbH, Fed. Rep. of Germany

[21] Appl. No.: 79,046

[22] Filed: Sep. 26, 1979

[30] Foreign Application Priority Data

Oct. 7, 1978 [DE] Fed. Rep. of Germany ....... 2843882

[51] Int. Cl.³ .......................................... B01J 47/00
[52] U.S. Cl. ...................................... 210/679; 210/94
[58] Field of Search .................. 210/25, 30 R, 36, 94, 210/96.1, 282, 290, 661, 662, 679, 684, 686, 688

[56] References Cited

U.S. PATENT DOCUMENTS

| | | | |
|---|---|---|---|
| 2,666,741 | 1/1954 | McMullen | 210/30 R |
| 2,749,307 | 6/1956 | Ellison | 210/94 |
| 2,751,081 | 6/1956 | La Motte | 210/94 |
| 2,761,833 | 9/1956 | Ward | 210/94 |
| 2,869,724 | 1/1959 | McDevitt | 210/94 |
| 3,163,597 | 12/1964 | Thrun | 210/30 R |
| 3,355,018 | 11/1967 | Smith | 210/94 |

Primary Examiner—Ivars C. Cintins
Attorney, Agent, or Firm—James E. Bryan

[57] ABSTRACT

This invention relates to equipment for rendering visible a specific metal charge of an ion exchanger comprising transparent viewing means, permeable container means behind said viewing means, and a mixture of chargeable resin particles and inert particles in said container means, said inert particles being lighter in weight than said resin particles when the latter are charged with metal ions. The invention also relates to a process for rendering visible a specific metal charge of an ion exchanger.

2 Claims, 6 Drawing Figures

*FIG. 1a*  FLOW DIRECTION

FLOW DIRECTION

SECTION A-A

PROCESS AND EQUIPMENT FOR RENDERING VISIBLE THE CHARGE OF ION EXCHANGERS

This invention relates to a process and equipment for rendering visible the specific metal charge of ion exchangers.

Indicator resins are used for rendering visible the charge in ion exchangers, —besides the physical measurement procedures such as pH measurements, and electrical conductivity, which at best however can show only the ion breakdown at the outlet —, which also react on the changes in pH of the resins and which indicate in each case the complete release of the $H^+$ions in cation exchangers or of $OH^-$ions in anion exchangers.

Such indications are non-specific and allow no inference concerning the kind of ions against which the $H^+/OH^-$ions are being exchanged.

However, as regards metal recovery, the information that an ion exchanger container is charged is insufficient, rather it is significant for the subsequent recovery processes to know that the exchanger is fully charged with metal ions of a specific kind.

This will be made clearer using the following example:

In galvanic operation, an ion exchanger is used only for the recovery of noble metals from wash waters and the subsequent required waste water treatment is assumed by a central decontamination plant. Besides valuable ions such as $Au(CN)_2^-$, there are also worthless or even toxic ones, such as $CN^-$, $HPO_3^-$ in the wash water, among other ions, which are all absorbed by the ion exchanger. Experience shows however that the complex ions will displace the weakly acid anions, so that later a predominantly complex charge will be ascertained in the ion exchange resin. The process and the equipment of the invention allow determination of when this state has occurred.

It is the object of the invention to provide a process and equipment for rendering visible the specific metal charge of ion exchangers.

This problem is solved by the invention in that a mixture of chargeable ion-exchange resin particles and an inert material is located in a container and in that the change in the specific weight of the resin particles when charged with metal ions is converted into an optical display.

In equipment for rendering visible the charge of ion exchangers, the mixture of ion-exchange resin particles and inert particles is located behind a viewing glass and becomes unmixed in relation to the differences in their densities in such a manner that the inert particles which were the heavier ones prior to charging deposit at the bottom of the viewing glass. This arrangement is reversed when the resin particles become heavier than the inert ones due to being charged with metal particles, suitable selection of the density of the inert particles determining for which kind of metal ion the display will take place.

In another advantageous embodiment of the invention, equipment is used in which initially the resin particles together with floating particles (for instance cork, foam or the like) are located at the top in a permeable sinking means that at first is located at the top of a closed cage (wire basket) and which when the ion-exchange resin particles are charged with metal ions sinks to the bottom, the density of the sinking means being so adjusted using the floating particles that the density of the liquid is exceeded when the resin particles contained in the sinking means are fully charged with a given metal ion type.

Further advantages, characteristics and applications of the invention are shown in the accompanying drawings in which:

FIG. 1a shows a mixture of uncharged resin particles and inert particles,

Figure 1B:
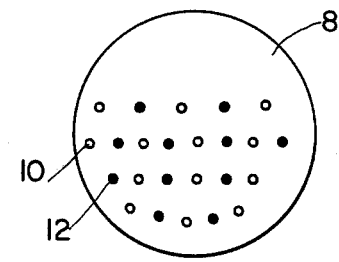
FIG. 1b shows charged resin particles above inert particles.
Figure 1B:
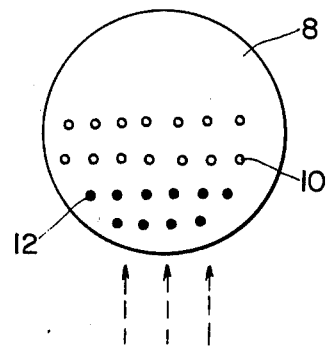
Figure 1C:
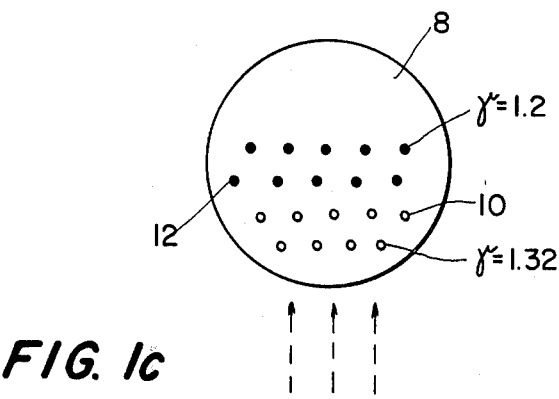
FIG. 1c shows the resin particles and inert particles in an unmixed condition, with the resin particles below the inert particles.

FIG. 1a through FIG. 1c show chargeable resin particles 10 and inert particles 12 in a liquid-permeable container behind a viewing glass 8. Both particles are of similar grain sizes to compensate for any flow effects. The inert particles preferably are pigmented and are of a density between the following limits: $\gamma$-particles charged $<\gamma$ inert-material $<\gamma$ resin charged with metal. For instance for waste waters with cyanidic gold: 1.10 g/cm$^3$ $<\gamma$ inert material $<1.32$ g/cm$^3$. If a density of $\gamma=1.20$ g/cm$^3$ is selected for the inert material, then the various particles will unmix corresponding to their densities, such a process being accelerated by the flow and the phases of FIGS. 1a through 1c then taking place.

FIG. 1a: after filling with a mixture in which the resin in uncharged ($\gamma=1.07$) and prior to flowing, resin particles 10 and inert particles 12 are located at random in the viewing glass.

FIG. 1b: after flow-through and primary charging with $CN^{31}$ ions, the inert particles 12 have sunk to the bottom of the viewing glass. If now the resin particles are gradually charged with the metal ions which are valuable for recovery, there will be an intermediate condition as shown in FIG. 1a, in which the random distribution between the resin particles 10 and the inert particles 12 gradually disappears and in which the resin particles 10 presently charged with heavy metal ions collect at the bottom.

This is shown in FIG. 1c. The resin particles and inert particles have entirely unmixed. The resin particles 10 are located at the bottom of the viewing glass. The inert particles 12 are deposited above. This is a clear indication that the ion exchanger container now is fully charged with the metal ions which are valuable for recovery and that an exchange is required. The ion exchanger container then is moved to a recovery facility for the valuable metal, in this case gold.

The line separating the resin and the inert material shows the charge of the ion exchange resin, and, depending upon the position of the resin (above or below the separating line), the kind of ion present in the liquid causing the charge now being recognizable.

Figure 2B:
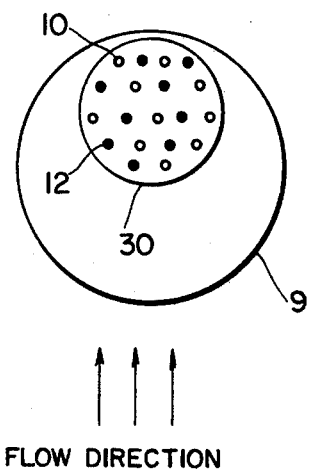
FIG. 2b shows the sinking body after primary charging and of a weight such that it floats.
Figure 2A:
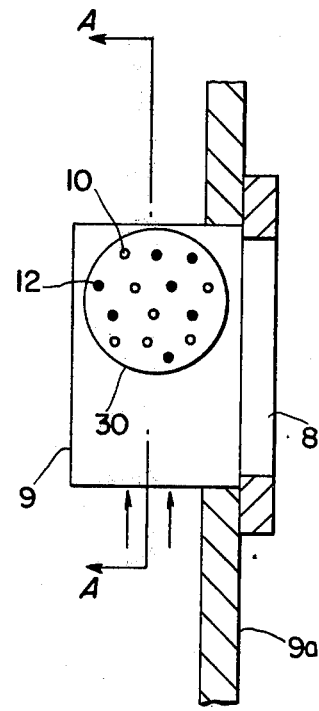
FIG. 2a shows a viewing glass and sinking body.

FIG. 2a shows a viewing glass 8 behind which is located a sinking body 30 of arbitrary shape but preferably in the form of a sphere and located in a wire basket 9 secured to a wall 9a of an ion exchanger.

The sinking body 30 is filled in such a manner with an ion exchange resin 10 in the form of resin particles and with a floating inert material that this filling amounts to at least 50% by volume, and preferably up to 90% by volume, of ion exchange resin and having, in the moistened state (saturated with water), a density of $\gamma < 1$ g/cm$^3$ (for instance 0.83 g/cm$^3$). In FIG. 2a the sinking body 30 floats at the upper rim of the wire basket 9 located behind the viewing glass 8.

Figure 2C:
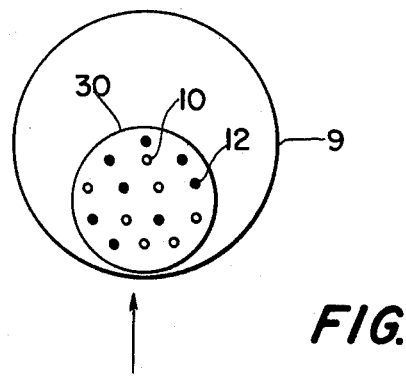
FIG. 2c shows the sinking body after further charging and of a weight such that it sinks.

If a filling with resin of 80% is assumed, then about 0.8 cm$^3$ of resin are contained in a wire basket of 1 cm$^3$, the resin then being capable of absorbing anions of the order of magnitude of 0.8 mval (equivalent weight). If now the basket is charged with $CN^-$ ions, this means an increase in weight of 20.8 mg, whereby the density of the wire basket is raised to 0.8508 g/cm$^3$. The sinking body 30 remains floating, as shown in FIG. 2b. If now for instance the sinking body is charged with $Au(CN)_2^-$ ions, it will increase in weight by 197 mg. The density of the sinking body rises to 1.029 g/cm$^3$. The sinking body 30 drops to the bottom of the wire basket 9, as shown in FIG. 2c. This is a clear indication that the ion exchanger is charged.

The filling in the sinking body 30 will always be such a mixture that the sinking body will increase in density due to the type of ions to be displayed to exceed 1 g/cm$^3$ (for pure water at about 18° C., otherwise the density of the particular saline solution at the corresponding temperature of the solution is determinant), while remaining at less than 1 g/cm$^3$ for the undesired ions.

The resin particles may be, for example, porous spheres based on polystyrene or other synthetic materials, preferably having a grain size in the range of 0.1 to 3.0 mm.

The inert particles may be, for example, plastic-based spheres with pigmentation making them distinctly different from the resin particles. The inert particles preferably have a grain size in the range of 0.1 to 3.0 mm.

Suitable inert particles may be hollow bodies of polypropylene, with a spherical or other shape, and other acid and alkali resistant plastic bodies having a density less than that of the solution flowing through the exchanger.

The sinking body 30 consists of a permeable plastic and can be screwed together or comprises at least one sealable orifice.

When the resin is regenerated, the procedure takes place in the reverse direction, so that the display means are also suited to this end.

It will be obvious to those skilled in the art that many modifications may be made within the scope of the present invention without departing from the spirit thereof, and the invention includes all such modifications.

What is claimed is:

1. Equipment for rendering visible a specific metal charge of an ion exchanger comprising transparent viewing means,
    permeable container means behind said viewing means,
    permeable sinkable body means in said permeable container means,
    and a mixture, in said sinkable body means, of chargeable resin particles and floatable inert particles, said mixture in an uncharged state being of lower density, and in a state of being charged with metal ions being of higher density, than a liquid to be treated.
2. A process for rendering visible a specific metal charge of an ion exchanger which comprises charging resin particles in admixture with inert particles in a liquid, said resin particles being lighter in weight than said inert particles prior to charging and heavier in weight than said inert particles after charging.

* * * * *